(12) United States Patent
Lowe et al.

(10) Patent No.: US 7,038,132 B1
(45) Date of Patent: May 2, 2006

(54) LINE AND LOW VOLTAGE COMBINATION OUTLET BOX

(75) Inventors: James C. Lowe, Springfield Gardens, NY (US); Patricia V. Roccaro, West Islip, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/204,700

(22) Filed: Aug. 16, 2005

(51) Int. Cl.
*H01H 9/02* (2006.01)

(52) U.S. Cl. .............................. 174/58; 174/50; 174/60; 248/906; 439/535

(58) Field of Classification Search ................. 714/50, 714/58, 60, 65 R; 439/535; 248/906; 220/4.02
See application file for complete search history.

(56) References Cited

U.S. PATENT DOCUMENTS

| | | | |
|---|---|---|---|
| 2,393,581 A * | 1/1946 | Wentworth | 220/3.3 |
| 4,634,015 A * | 1/1987 | Taylor | 220/3.7 |
| 5,117,996 A * | 6/1992 | McShane | 220/3.7 |
| 5,486,650 A | 1/1996 | Yetter | |
| 6,218,613 B1 | 4/2001 | Justiniano et al. | |

FOREIGN PATENT DOCUMENTS

| CA | 2280056 A1 | 2/2000 |
|---|---|---|
| MX | 212339 | 12/2002 |

OTHER PUBLICATIONS

EC&M, 2003 EC&M Product of the Year Platinum Award, EC&M Magazine, Mar. 4, 2002.

* cited by examiner

*Primary Examiner*—Dhiru R. Patel
(74) *Attorney, Agent, or Firm*—Leviton Manufacturing Co., Inc.; Richard J. Ulrich

(57) ABSTRACT

A combination outlet box is disclosed which allows for the termination of both line and low voltage field wiring at the same location within a standard single gang electrical outlet box opening. In addition, the combination outlet box allows for a variety of configurations for routing the line and low voltage field wiring while providing the required separation between line and low voltage field wiring. The combination outlet box also provides for sufficient outlet box volume for both line and low voltage field wiring.

18 Claims, 7 Drawing Sheets

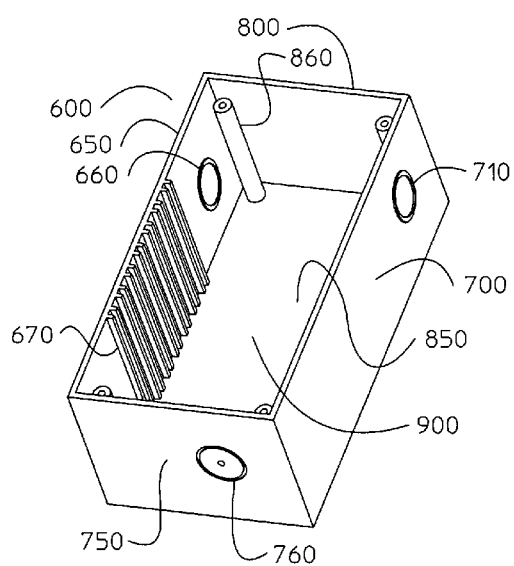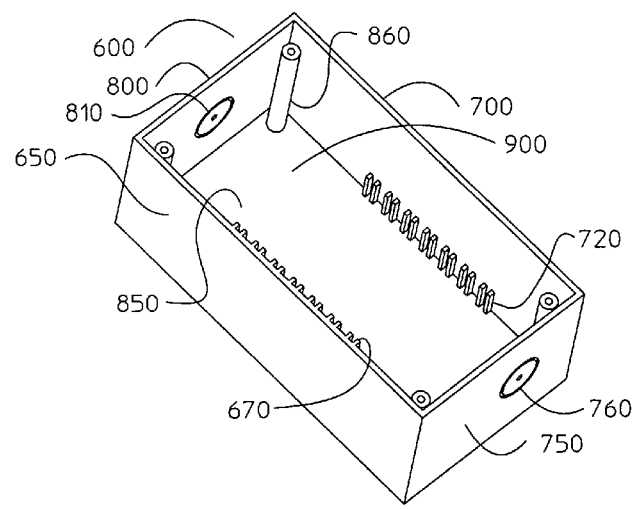
FIG. 7A
FIG. 7B

LINE AND LOW VOLTAGE COMBINATION OUTLET BOX

BACKGROUND

This invention relates to a combination electrical outlet box and more specifically a combination electrical outlet box with multiple chambers for both line and low voltage field wiring.

In many newer electrical installations, there is a need to have both high voltage and low voltage circuits terminating at the same location. One such example could be an electrical wiring device which is supplied by standard 120 VAC residential power and is controlled by a low voltage signal circuit. In this instance, both line and low voltage circuits would terminate at the same point. However, Section 725.55 of the National Electric Code (NEC) requires that the two voltages be isolated from one another by separate enclosures, barriers, or the like.

It is an object of this invention to provide for a convenient termination point for both line and low voltage circuits while maintaining the required separation between the two levels of voltages.

It is another object of this invention to provide sufficient box volume for each circuit.

SUMMARY

The present combination outlet box incorporates separate boxes for both line and low voltage field wiring. The flush box, which is intended to sit flush with the sheetrock in a typical installation, has a volume in which the line voltage field wiring is terminated in a similar manner as a standard electrical box for a receptacle, switch, or the like. In addition, the flush box also contains an enclosed channel which runs up one of the sides of the flush box for routing of low voltage field wiring while maintaining the required separation from the line voltage field wiring.

In addition to the flush box, there is also a recessed box which sits behind the sheetrock wall and the flush box in the typical installation. The recessed box accommodates the low voltage field wiring. Alternatively, a moveable barrier may be installed in the recessed box separating it into two separate volumes. In this configuration, the recessed box can contain both line and low voltage field wiring.

DESCRIPTION OF THE DRAWINGS

FIG. 7A is a perspective view of the recessed box shown in FIGS. 2, 3, & 4.

FIG. 7B is another perspective view of the recessed box shown in FIGS. 2, 3, & 4.

DETAILED DESCRIPTION

Figure 1:
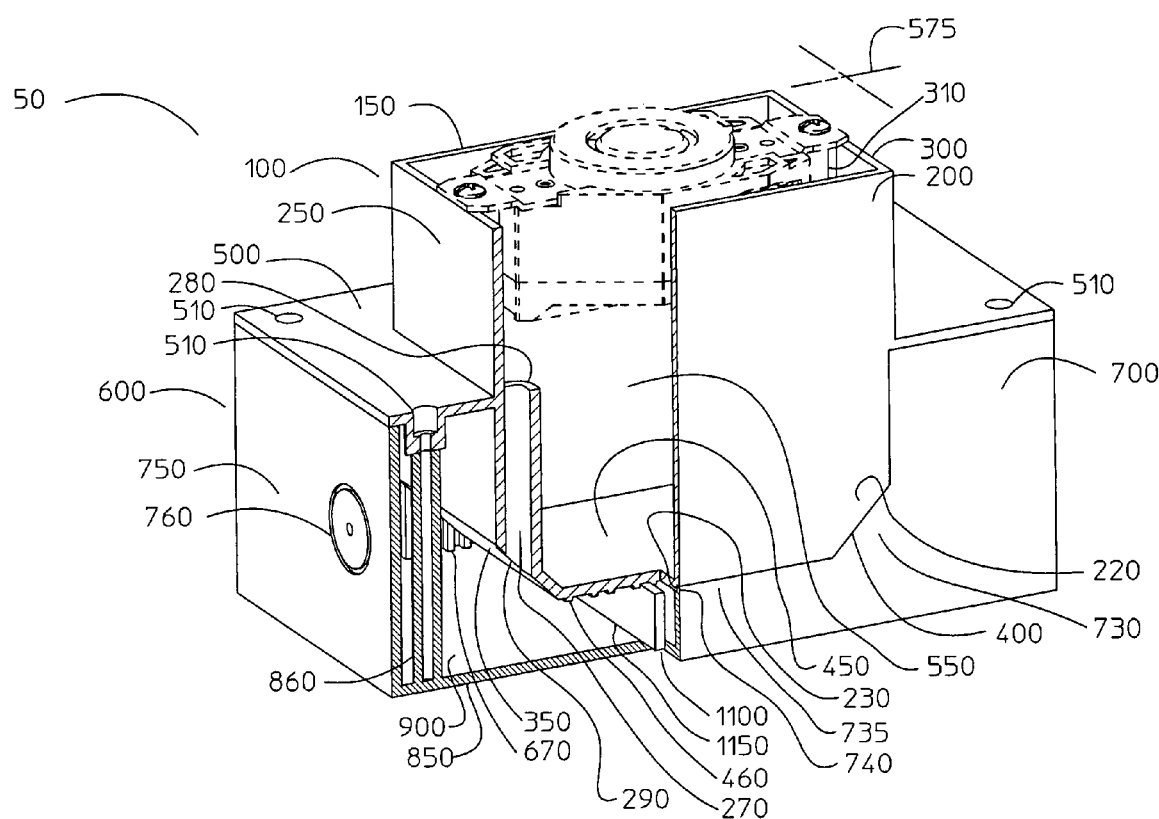
FIG. 1 is a perspective view of an embodiment of the combination outlet box.

FIG. 1 shows a perspective view of the combination outlet box 50. The combination outlet box contains three separate main parts, each of which may be formed integrally from molded plastic: a flush box 100, a recessed box 600, and, optionally, an L-shaped moveable barrier 1100.

The flush box 100 resembles a standard plastic electrical box typically used to house an electrical wiring device such as a receptacle, switch, or the like. In addition, the dimensions of the flush box 100 are substantially the same as a standard plastic electrical box. The flush box 100 incorporates four (4) sides: a first long side 150, a second long side 200, a first short end 250 and a second short end 300. In addition, the flush box also includes a first slanted member 350 and a second slanted member 400. These two slanted members, 350 and 400 respectively, project diagonally, towards each other, from the first and second short ends, 250 and 300, respectively. Furthermore, the flush box 100 also includes a bottom 450. The two sides, two ends, two slanted members, and bottom define the flush box volume 550 into which an electrical device can be installed. The top edges of the two sides and the two ends away from the bottom member define the flush plane 575 where the face of the installed wiring device will lie once the installation is complete. Optionally, the flush box 100 can be comprised of just the two sides, two ends, and a bottom; omitting the two slanted members. In this fashion the flush box is simply rectangular.

Figure 5A:
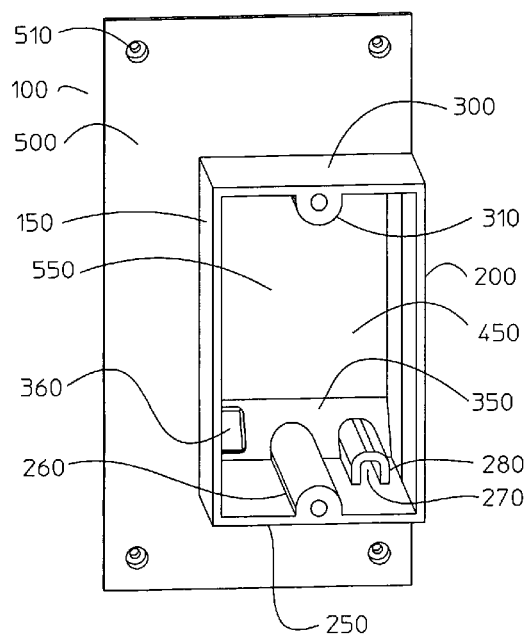
FIG. 5A is a top view of the flush box shown in FIG. 2.

Referring to FIG. 5A, the first short end 250 contains a first device mounting boss 260 and the second short end 300 contains a second device mounting boss 310. An electrical wiring device can be fixed to the flush box 100 with the use of standard mounting screws threaded into the first and second device mounting bosses, 260 and 310, respectively.

Figure 2:
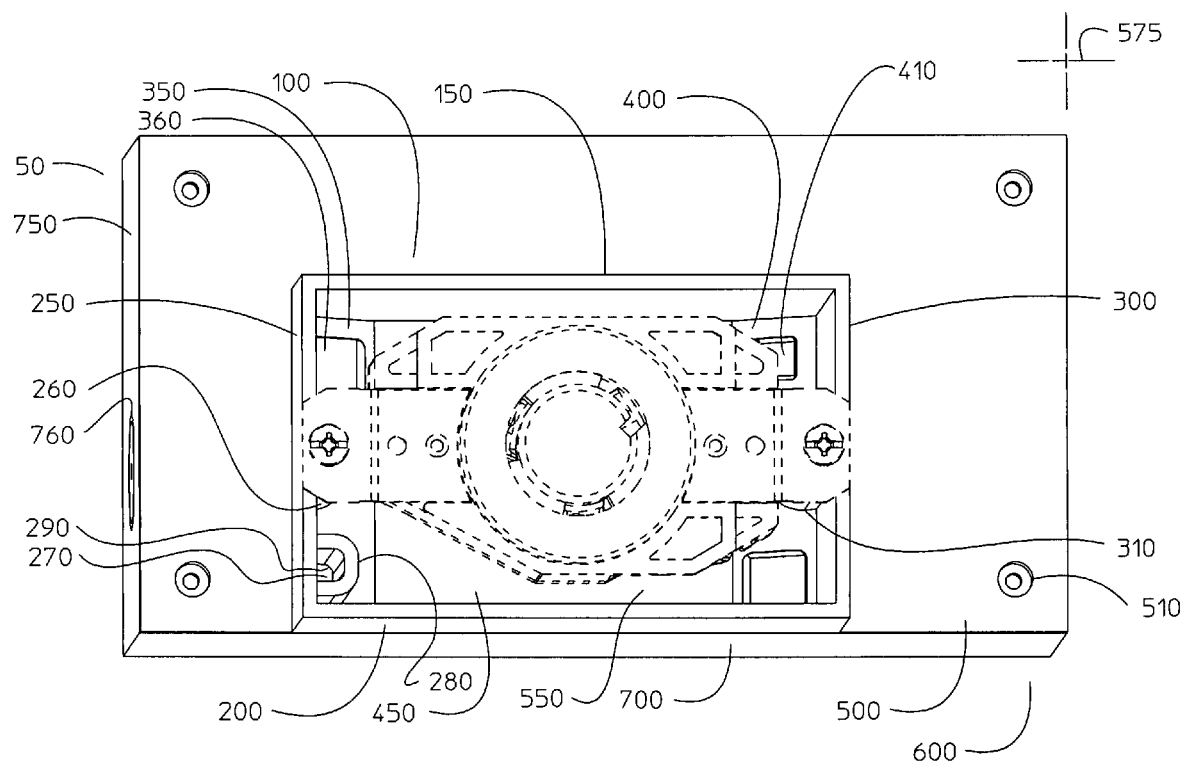
FIG. 2 is a top view of another embodiment of the combination outlet box.
Figure 3:
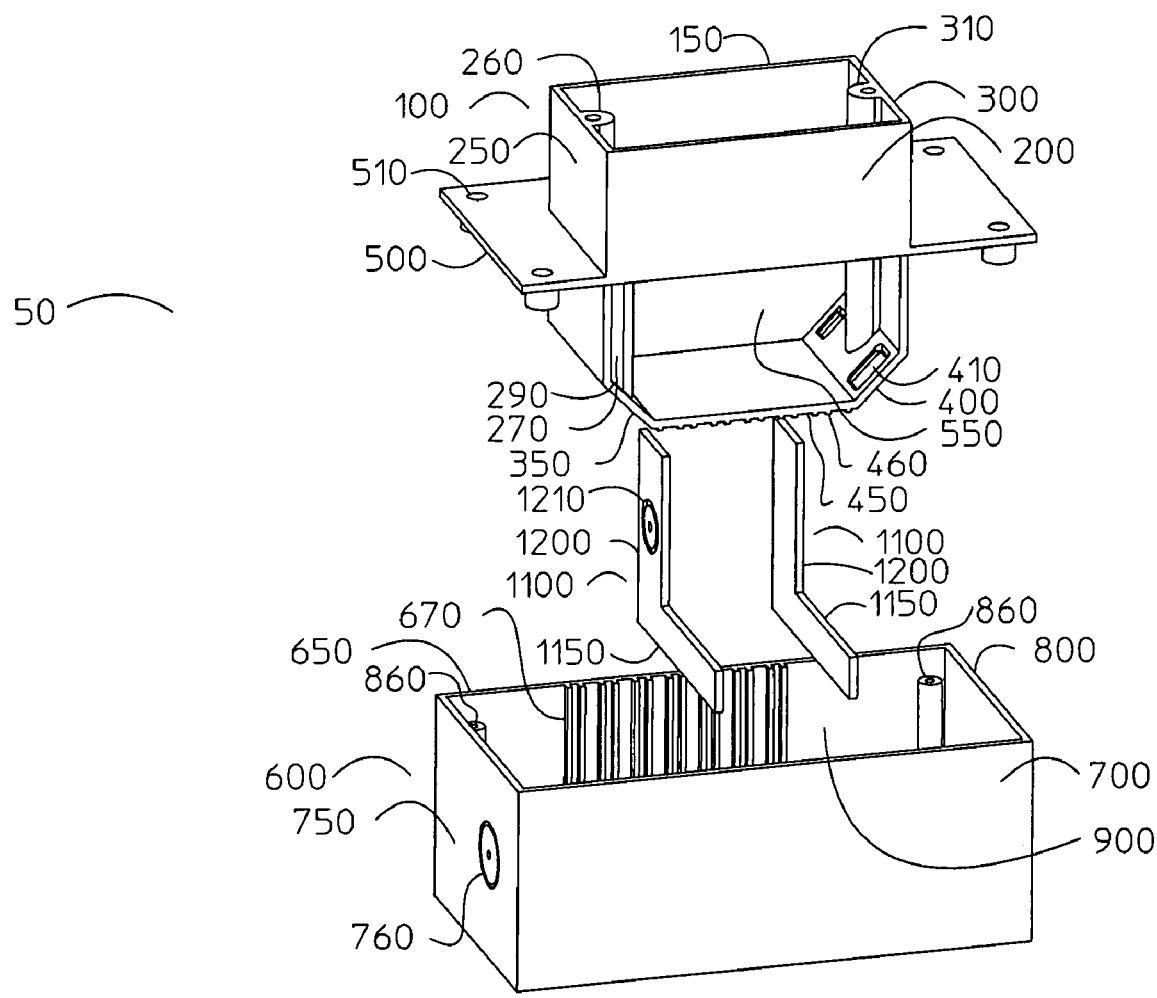
FIG. 3 is an exploded perspective view of the embodiment shown in FIG. 2.

Referring to FIGS. 2, 3, and 5A, the first slanted member 350 may optionally contain one or more wiring knockouts 360 so that the external field wiring may enter into the flush box volume 550 to connect with the wiring device that is installed in the flush box 100. The second slanted member 400 may also optionally contain one or more wiring knockouts 410 for receiving the field wiring.

Referring to FIGS. 3, 4, 5A and 5B, the flush box 100 is integrally formed with a rectangular midway flange cover 500 which projects outward from the first short end 250, the second short end 300, and the first long side 150 of the flush box 100. The midway flange cover 500 is disposed at approximately midway along the first short end 250, the second short end 300, and the first long side 150 of the flush box 100. Near the corners of the midway flange cover 500 are four (4) recessed box mounting holes 510. Surrounding each of the holes 510, on the underside of the midway flange cover 500 is a boss to provide added strength around each hole. The midway flange cover 500 is what is used to mount the flush box 100 to the recessed box 600.

Referring to FIGS. 7A and 7B, the recessed box 600 is comprised of five main elements: a first long side 650, a second long side 700, a first short end 750, a second short end 800, and a bottom 850. These five main elements define the recessed box volume 900. The five main elements of the recessed box 600 are sized such that the recessed box volume 900, minus the portion of the recessed box volume 900 occupied by the flush box 100 when the flush box 100 is mounted to the recessed box 600, is at least equal to the volume of the flush box volume 550. Near the corners of the recessed box 600 are located four (4) flush box mounting bosses 860.

The first long side 650 and the second long side 700 may each optionally contain one or more knockouts 660 and 710, respectively, for receiving the field wiring (refer to FIG. 7A). Likewise, the first short end 750 and the second short end 800 may also contain one or more knockouts 760 and 810, respectively, for receiving the field wiring.

Referring to FIG. 2, the second long side 700 of the recessed box 600 is longer than and coplanar with the second long side 200 of the flush box 100. The first long side 650 of the recessed box 600 is longer than and parallel to the first long side 150 of the flush box 100. The first and second short ends 750 and 800 of the recessed box 600 are longer than and parallel with the first and second short ends 350 and 400 of the flush box 100, respectively. The relation between the recessed box 600 and the flush box 100 is such that, while looking at the flush plane 575, the flush box 100 lies within the recessed box 600 and is positioned generally midway in the longer dimension and sitting on the second long side 700 of the recessed box. The fact that the second long side 200 of the flush box 100 is coplanar with the second long side 700 of the recessed box 600 allows the second long side 200 of the flush box 100 to sit up directly against a building stud once the combination outlet box is installed as intended, as is the case with a standard electrical box.

The midway flange cover 500 of the flush box 100 is mounted onto the recessed box 600 through the use of four (4) threaded screws which are passed through the four recessed box mounting holes 510 on the midway flange cover 500 and threaded into the four flush box mounting bosses 860 on the recessed box 600.

Figure 6:
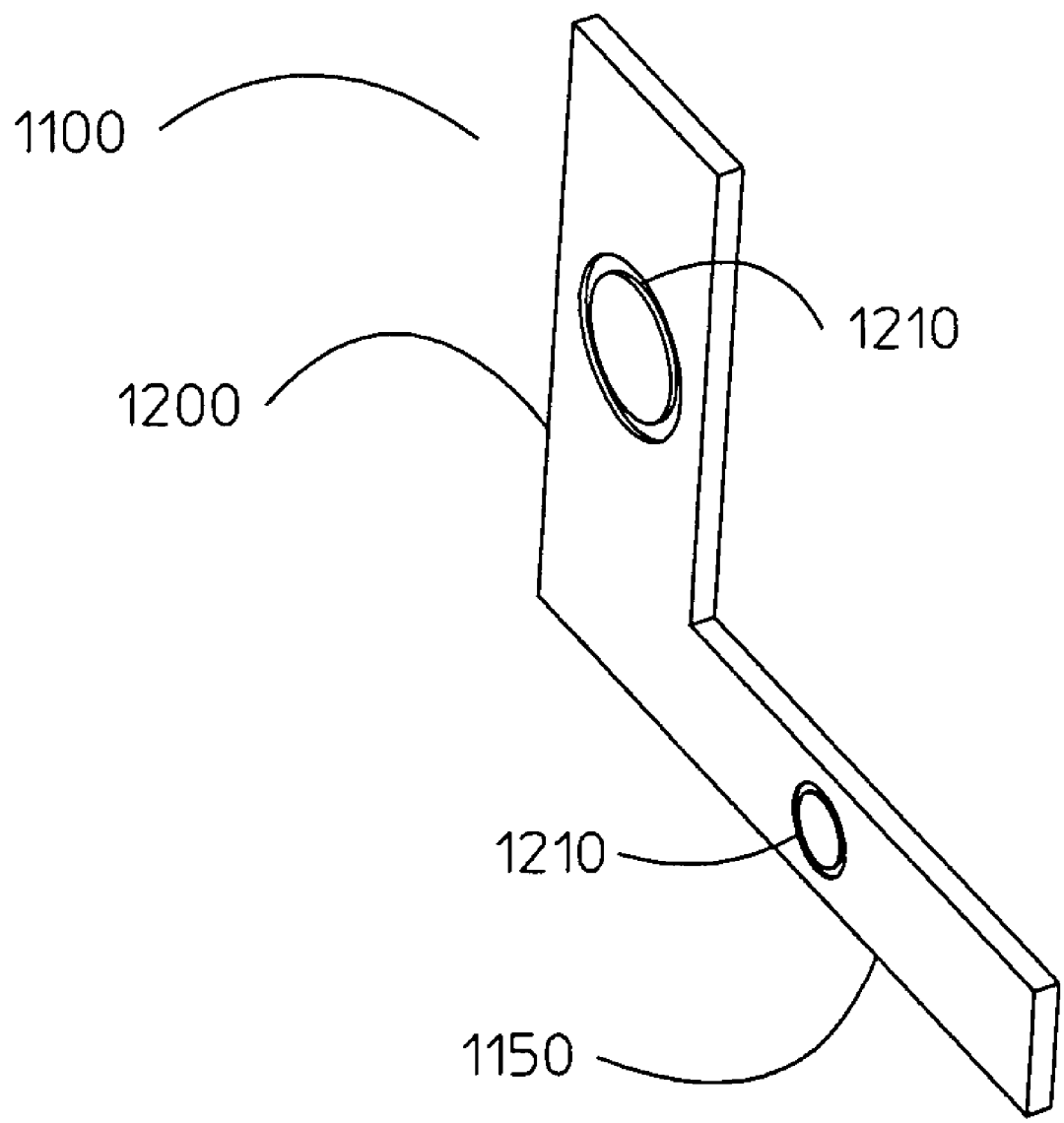
FIG. 6 is a perspective view of the moveable barrier shown in FIGS. 1, 3, & 4.

Referring to FIG. 6, the optional L-shaped moveable barrier 1100 is an integral planar piece of molded plastic. It may be described as having a horizontal thin arm 1150 and a vertical thick arm 1200. The horizontal thin arm 1150 and the vertical thick arm 1200 project at a right angle from each other. The moveable barrier may optionally contain one or more knockouts 1210.

Prior to assembling the flush box 100 to the recessed box 600, the L-shaped moveable barrier 100 may be optionally be placed in the recessed box 600. If present, the L-shaped moveable barrier 1100 would be placed inside the recessed box 600 in a plane parallel to the first and second short ends, 750 and 800, respectively, of the recessed box 600 so as to separate the recessed box volume 900 into two separate volumes. The L-shaped moveable barrier 1100 is held in place by three separate racks which allow its position within the recessed box 600 to be adjusted. The first rack is the full height vertical rack 670 located on the first long side 650 of the recessed box 600. This rack positions the vertical thick arm 1200 of the L-shaped moveable barrier 1100. The second rack is the partial height vertical rack 720 located on the second long side 700 of the recessed box 600. This second rack positions the horizontal thin arm 1150 of the L-shaped moveable barrier 1100. The third rack is the horizontal rack 460 located on the underside of the bottom 450 of the flush box 100.

Figure 5B:
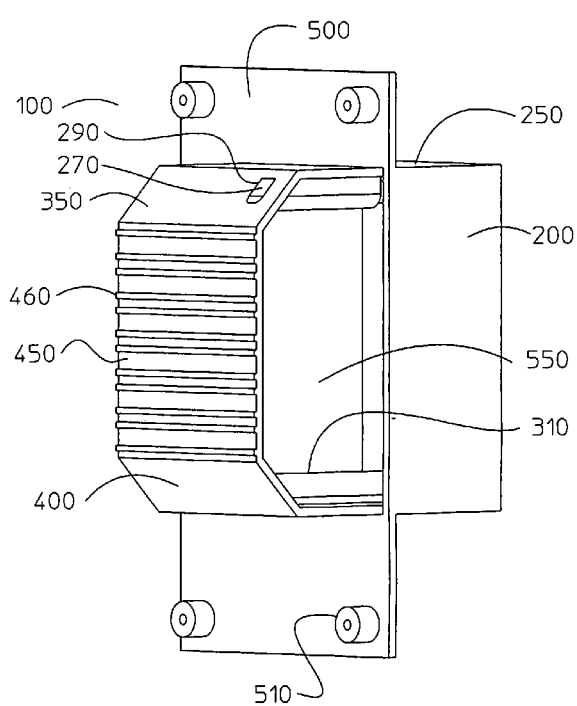
FIG. 5B is a bottom perspective view of the flush box shown in FIG. 2.

Referring to FIGS. 5A and 5B, there is a wiring channel 270, which has a first end 280 and a second end 290, for low voltage field wiring located in the interior of the flush box 100. The flush box volume 550 (aside from the volume taken up by the wiring channel 270) is to be used for the line voltage field wiring. The wiring channel 270 is to be used for the low voltage field wiring. The wiring channel 270 runs vertically along the first short end 250 of the flush box 100 from the first slanted member 350 to about halfway up the first short end 250 (at roughly the same level as the midway flange cover 500). This wiring channel 270 may have a cross-section similar to a U-shape with the ends of the "U" connected to the first short end 250. There is an opening on the underside of the first slanted member 350 leading into the second end 290 of the wiring channel 270 and an opening on the first end 280 of the wiring channel 270 leading into the flush box volume 550 The first end 280 of the wiring channel 270 lies at a point just behind where the back of an installed wiring device would be.

With the wiring channel 270 constructed as just described, low voltage field wiring can be run from outside the recessed box 600, through one of the knockouts 660, 710, 760, or 810, into the recessed box volume 900, through the second end 290 of the wiring channel 270 of the flush box 100, up through the wiring channel 270 and out of the first end 280 of the wiring channel 270 and directly into the wiring device installed in the flush box 100. The walls of the wiring channel 270 provide the required separation between the low voltage field wiring and the line voltage field wiring.

The recessed box volume 900 can be used in one of two configurations. The first configuration would be where the entire recessed box volume 900 is to be used exclusively for the low voltage field wiring. In this case, the L-shaped moveable barrier 1100 can simply be omitted in the installation. Optionally, the L-shaped moveable barrier 1100 can be used with one or more of its knockouts 1210 removed. In this manner, the L-shaped moveable barrier would be used to aid in positioning the low voltage field wiring in a neat manner.

The second configuration of the recessed box volume 900 would be where a portion of the volume would be used for low voltage field wiring and the remaining portion would be used for line voltage field wiring. In this case, the L-shaped moveable barrier 1100 would be mandatory to provide the required separation of circuits. Further, if the moveable barrier contains one or more knockouts 1210, every such knockout 1210 would be required to not be removed. Therefore, the moveable barrier would be a solid wall with the absence of any openings in it. In this second configuration, low voltage field wiring would enter the side of the recessed box 600 below the opening for the second end 290 of the wiring channel 270. The low voltage field wiring would then enter the second end 290 of the wiring channel 270 and then up to the first end 280 of the wiring channel 270 and to the back of the installed wiring device. The line voltage field wiring would then enter into the other side of the recessed box volume 900 and up through a knockout in the flush box 100 directly into the flush box volume 550 and into the wiring device.

For the construction of both the flush box 100 and the recessed box 600 there are three different embodiments. Referring to FIGS. 2, 3, 5A, and 5B, for the first embodiment, the second long side 200 of the flush box 100 is a solid wall for the portion of the second long side 200 above the midway flange cover 500. Below the midway flange cover, the second long side 200 is absent. This is because the space is taken up by the second long side 700 of the recessed box 600 (since the second long side 200 of the flush box 100 and the second long side 700 of the recessed box 600 are coplanar). Therefore, referring to FIGS. 2, 3, 7A, and 7B, in this first embodiment, the second long side 700 of the recessed box 600 is in the shape of a full rectangular wall.

Referring to FIG. 1, for the second embodiment, the second long side 200 of the flush box 100 is a full solid wall both above and below the midway flange cover 500. The portion of the second long side 200 of the flush box 100 below the midway flange cover 500 has a perimeter 220. Since the second long side 200 of the flush box 100 and the second long side 700 of the recessed box 600 are coplanar, there needs to be a cutout 730 in the second long side 700 of the recessed box 600 to accommodate the second long side 200 of the flush box 100. This cutout 730 includes a tongue 740 along the edge 735 of the cutout 730. The tongue 740 matches a corresponding groove 230 on the perimeter 220 of the second long side 200 of the flush box 100. This is such that the second long side 200 of the flush box 100 and the second long side 700 of the recessed box 600 form a single solid wall when the flush box 100 is mounted to the recessed box 600.

Figure 4:
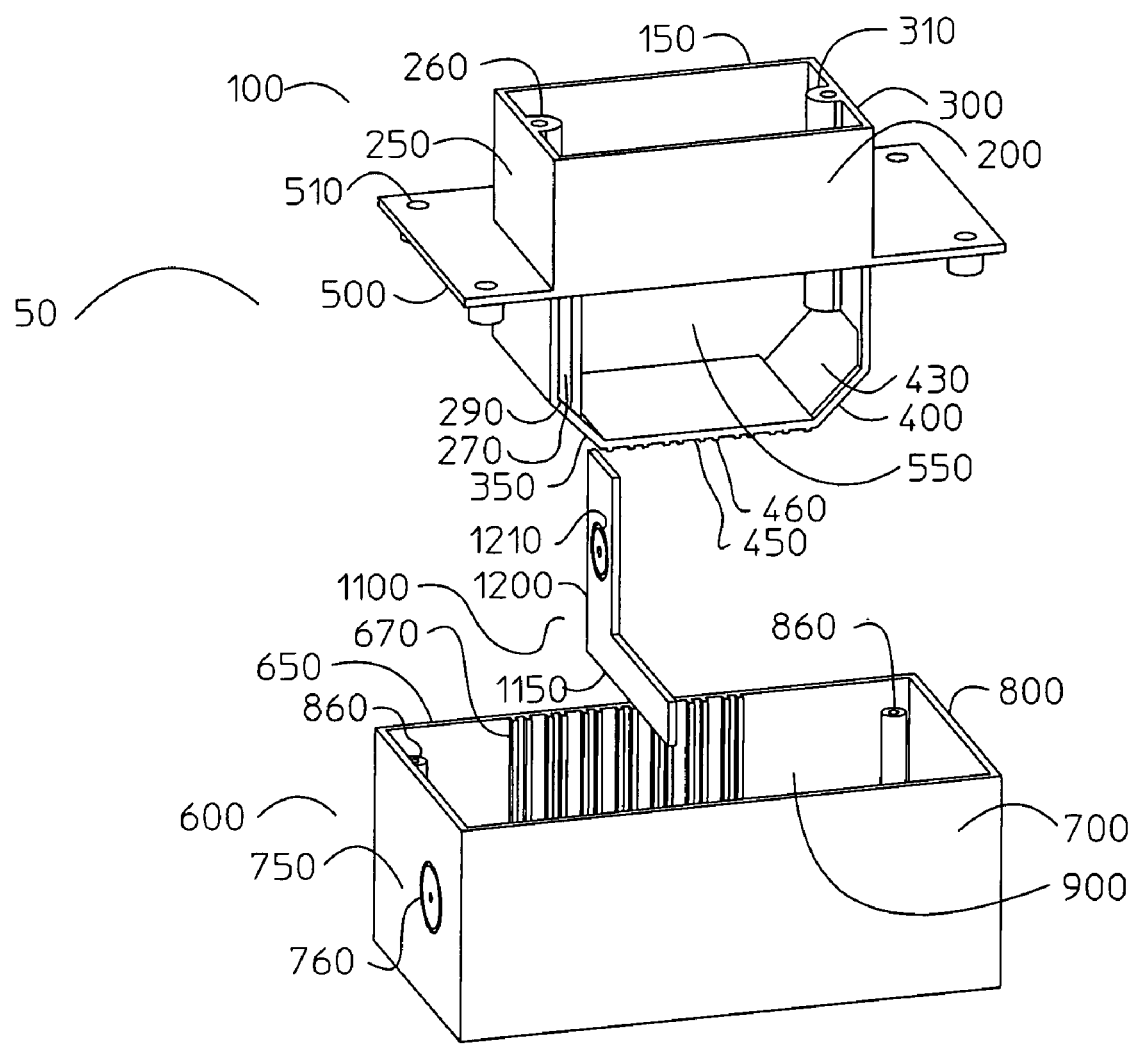
FIG. 4 is an exploded perspective view of another embodiment of the combination outlet box.

Referring to FIG. 4, the third embodiment, is the same as the first embodiment except that a large portion of the second slanted member 400 of the flush box 100 is cutout such that there is a large opening 430 between the flush box 100 and the recessed box 600 (instead of a knockout). This third embodiment is only valid when the recessed box volume 900 is separated into two portions for low voltage and line voltage field wiring, respectively. Here the second slanted member 400 would be positioned directly above the portion of the recessed box volume 900 that is dedicated to the line voltage field wiring.

The invention claimed is:

1. A combination outlet box comprising
   a flush box having a bottom, said bottom having an opening, said flush box having a flush box volume; and
   a recessed box having a recessed box volume;
   said flush box having a midway flange cover which projects perpendicular from said flush box for mounting said flush box to said recessed box; and
   said flush box having a wiring channel disposed within said flush box volume;
   said wiring channel having a first end and a second end;
   said first end of said wiring channel leads into said flush box volume; and
   said second end of said wiring channel leads into said recessed box volume at said opening in said bottom of said flush box when said flush box is mounted to said recessed box.

2. The combination outlet box of claim 1, wherein the portion of said recessed box volume not occupied by said flush box when said flush box is mounted to said recessed box, is not less than said flush box volume.

3. The combination outlet box of claim 1, further comprising a moveable barrier which separates said recessed box volume into two separate chambers; and
   said recessed box comprising a first long side, a second long side, a first short end, a second short end, and a bottom which define said recessed box volume;
   said first long side of said recessed box having a first vertical rack and said second long side of said recessed box having a second vertical rack; and
   said flush box comprising a first long side, a second long side, a first short end, a second short end, and a bottom which define said flush box volume; and
   said bottom of said flush box having a horizontal rack; and
   said moveable barrier being held in any one of a plurality of locations within said recessed box volume by said first vertical rack, said second vertical rack, and said horizontal rack when said flush box is mounted to said recessed box.

4. The combination outlet box of claim 1, further comprising a moveable barrier which separates said recessed box volume into two separate chambers; and
   said recessed box comprising a first long side, a second long side, a first short end, a second short end, and a bottom which define said recessed box volume;
   said first long side of said recessed box having a first vertical rack and said second long side of said recessed box having a second vertical rack; and
   said flush box comprising a first long side, a second long side, a first short end, a second short end, a first slanted member, a second slanted member, and a bottom which define said flush box volume; and
   said bottom of said flush box having a horizontal rack; and
   said moveable barrier being held in any one of a plurality of locations within said recessed box volume by said first vertical rack, said second vertical rack, and said horizontal rack when said flush box is mounted to said recessed box.

5. The moveable barrier of claim 4, further comprising a removable knockout.

6. The combination outlet box of claim 4, wherein the second slanted member incorporates a permanent opening which allows field conductors to pass from said recessed box volume to said flush box volume.

7. The combination outlet box of claim 4, wherein said second long side of said flush box extends above said midway flange cover and is absent below said midway flange cover such that when the flush box is mounted to the recessed box, said second long side of said flush box is directly above and coplanar with said second long side of said recessed box.

8. The combination outlet box of claim 4, wherein said second long side of said flush box extends both above and below said midway flange cover, the portion of the second long side of said flush box below said midway flange cover having a perimeter; and
   said second long side of said recessed box having a cutout in the shape of the portion of said second long side of said flush box below said midway flange cover, said cutout having an edge; and
   said perimeter of said second long side of said flush box below said midway flange having a groove; and
   said edge of said cutout of said second long side of said recessed box having a tongue such that when said flush box is mounted to said recessed box, said groove of said perimeter of second long side of said flush box is engaged with said tongue of said edge of second long side of said recessed box and said second long side of said flush box and said second long side of said recessed box are coplanar and form a solid wall.

9. The combination outlet box of claim 4, wherein said flush box along with said midway flange cover are together integrally formed from a molded thermoplastic compound.

10. The combination outlet box of claim 4, wherein said recessed box is integrally formed from a molded thermoplastic compound.

11. The combination outlet box of claim 4, wherein said wiring channel has a cross-section in the shape of a "U."

12. The combination outlet box of claim 4, wherein said first vertical rack extends from said bottom of said recessed box and traverses the full height of said first long side of said recessed box; and
   said second vertical rack extends from said bottom of said recessed box and traverses less than a third of the height of said second long side of said recessed box.

13. The combination outlet box of claim 4, wherein said moveable barrier is integrally formed from a molded thermoplastic compound.

14. The moveable barrier of claim 13, wherein said moveable barrier is "L" shaped having a horizontal arm and a vertical arm, said horizontal arm is thinner than said vertical arm.

15. A combination outlet box comprising
a flush box having a bottom, said bottom having an opening, said flush box having a flush box volume; and
a recessed box having a recessed box volume;
said flush box having a midway flange cover which projects perpendicular from said flush box for mounting said flush box to said recessed box; and
said flush box having a wiring channel disposed within said flush box volume;
said wiring channel having a cross-section in the shape of a "U"
said wiring channel having a first end and a second end;
said first end of said wiring channel leads into said flush box volume; and
said second end of said wiring channel leads into said recessed box volume at said opening in said bottom of said flush box when said flush box is mounted to said recessed box.

16. The combination outlet box of claim 15, wherein when said flush box is mounted to said recessed box, said recessed box volume includes a first portion and a second portion;
said first portion of said recessed box volume is occupied by said flush box; and
said second portion of volume of said recessed volume is not occupied by said flush box; and
said second portion of said recessed box volume is not less than said flush box volume.

17. The combination outlet box of claim 15, wherein said second portion of said recessed box volume is equal to said flush box volume.

18. The combination outlet box of claim 15, wherein said second portion of said recessed box volume is greater than said flush box volume.

* * * * *